US012784437B2

(12) United States Patent
Kawai et al.

(10) Patent No.: US 12,784,437 B2
(45) Date of Patent: Nov. 3, 2026

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventors: Ryo Kawai, Tokyo (JP); Noboru Yoshida, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 18/834,322

(22) PCT Filed: Feb. 14, 2022

(86) PCT No.: PCT/JP2022/005682

§ 371 (c)(1),
(2) Date: Jul. 30, 2024

(87) PCT Pub. No.: WO2023/152973

PCT Pub. Date: Aug. 17, 2023

(65) Prior Publication Data

US 2025/0131708 A1 Apr. 24, 2025

(51) Int. Cl.
*G06V 40/10* (2022.01)
*G06V 10/75* (2022.01)
*G06V 10/98* (2022.01)

(52) U.S. Cl.
CPC .......... *G06V 10/993* (2022.01); *G06V 10/751* (2022.01); *G06V 40/10* (2022.01)

(58) Field of Classification Search
CPC .... G06V 10/993; G06V 10/751; G06V 40/10; G06V 40/103; H04N 7/18

(Continued)

(56) References Cited

U.S. PATENT DOCUMENTS

2011/0267344 A1* 11/2011 Germann ............... G06V 20/64 382/154
2015/0063640 A1* 3/2015 Anabuki ................ G06V 20/52 382/103

(Continued)

FOREIGN PATENT DOCUMENTS

JP 2019-102877 A 6/2019
JP 2019-103067 A 6/2019

(Continued)

OTHER PUBLICATIONS

International Search Report for PCT Application No. PCT/JP2022/005682, mailed on May 10, 2022.

(Continued)

*Primary Examiner* — Ali Bayat
(74) *Attorney, Agent, or Firm* — Sughrue Mion, PLLC

(57) ABSTRACT

The present invention provides an image processing apparatus (10) including: a skeleton structure detection unit (11) that performs processing of detecting a keypoint of a human body included in each of a plurality of images generated by a plurality of cameras capturing a same place; a determination unit (12) that determines a same human body included in the plurality of images generated by the plurality of cameras; a quality value computation unit (13) that computes, for each human body, a quality value of the keypoint detected from the plurality of images generated by the plurality of cameras; and an output unit (14) that outputs information indicating a place where a human body with the quality value equal to or more than a threshold value is captured, or a partial image acquired by cutting the place out of the image.

20 Claims, 13 Drawing Sheets

(58) Field of Classification Search
USPC .......................................................... 382/115
See application file for complete search history.

(56) References Cited

U.S. PATENT DOCUMENTS

| | | | | |
|---|---|---|---|---|
| 2018/0341803 | A1* | 11/2018 | Matsushita | G06V 40/161 |
| 2020/0312117 | A1* | 10/2020 | Otake | G08B 21/18 |
| 2024/0013415 | A1* | 1/2024 | Tam | G06V 40/10 |
| 2025/0157077 | A1* | 5/2025 | Yoshida | G06T 7/74 |

FOREIGN PATENT DOCUMENTS

| | | | |
|---|---|---|---|
| JP | 2021-056968 | A | 4/2021 |
| WO | 2021/084677 | A1 | 5/2021 |
| WO | 2021/250808 | A1 | 12/2021 |
| WO | 2022/009301 | A1 | 1/2022 |

OTHER PUBLICATIONS

Zhe Cao, Tomas Simon, Shih-En Wei, Yaser Sheikh, "Realti me Multi-Person 2D Pose Estimation using Part Affinity Fields", The IEEE Conference on Computer Vision and Pattern Recognition (CVPR), 2017, p. 7291-7299.

* cited by examiner

IN CASE OF MOVING IMAGE

FIG. 8

| HUMAN BODY IDENTIFICATION INFORMATION | ATTRIBUTE INFORMATION | | | | |
|---|---|---|---|---|---|
| | QUALITY VALUE | NUMBER OF DETECTED KEYPOINTS | PLACE IN IMAGE | DATE AND TIME | .... |
| B001321 | 89 | 14 | * * * | 2021. 1.20 | .... |
| .... | .... | .... | .... | .... | .... |

IMAGE PROCESSING APPARATUS, IMAGE PROCESSING METHOD, AND NON-TRANSITORY STORAGE MEDIUM

This application is a National Stage Entry of PCT/JP2022/005682 filed on Feb. 14, 2022, the contents of all of which are incorporated herein by reference, in their entirety.

TECHNICAL FIELD

The present invention relates to an image processing apparatus, an image processing method, and a program.

BACKGROUND ART

A technique related to the present invention is disclosed in Patent Documents 1 to 4 and Non-Patent Document 1.

Patent Document 1 discloses a technique for computing a feature value of each of a plurality of keypoints of a human body included in an image, searching for an image including a human body with a similar pose and a human body with a similar movement, based on the computed feature value, and putting together the similar poses and the similar movements and classifying. Further, Non-Patent Document 1 discloses a technique related to skeleton estimation of a person.

Patent Document 2 discloses a technique for extracting a skeleton point (position of a joint) from each image captured by a plurality of cameras, and pairing the extracted skeleton point with a skeleton point indicating a position of the same joint of the same person extracted from the plurality of images.

Patent Document 3 discloses a technique for capturing the same subject by a plurality of cameras from a plurality of directions.

Patent Document 4 discloses a technique for extracting a skeleton point associated with an object (for example: a person) being a detection target from an image, and deciding that the target is the object being the detection target in a case where the number of the skeleton points with a degree of reliability equal to or more than a threshold value among the extracted skeleton points is equal to or more than a threshold value.

RELATED DOCUMENT

Patent Document

Patent Document 1: International Patent Publication No. WO2021/084677

Patent Document 2: Japanese Patent Application Publication No. 2019-102877

Patent Document 3: Japanese Patent Application Publication No. 2019-103067

Patent Document 4: Japanese Patent Application Publication No. 2021-56968

Non-Patent Document

Non-Patent Document 1: Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

DISCLOSURE OF THE INVENTION

Technical Problem

According to the technique disclosed in Patent Document 1 described above, a human body with a desired pose and a desired movement can be detected from an image being a processing target by preregistering, as a template image, an image including a human body with a desired pose and a desired movement. Then, as a result of discussing such a technique disclosed in Patent Document 1, the present inventor has newly found out that accuracy of detection decreases without registering an image of certain quality as a template image and there is room for improvement in workability of work for preparing such a template image.

All of Patent Documents 1 to 4 and Non-Patent Document 1 described above do not disclose a problem related to a template image and a solution to the problem, and thus have a problem that the problem described above cannot be solved.

One example of an object of the present invention is, in view of the problem described above, to provide an image processing apparatus, an image processing method, and a program that solve a problem of workability of work for preparing a template image of certain quality.

Solution to Problem

One aspect of the present invention provides an image processing apparatus including:

- a skeleton structure detection unit that performs processing of detecting a keypoint of a human body included in each of a plurality of images generated by a plurality of cameras capturing a same place:
- a determination unit that determines a same human body included in the plurality of images generated by the plurality of cameras:
- a quality value computation unit that computes, for each human body, a quality value of the keypoint detected from the plurality of images generated by the plurality of cameras: and
- an output unit that outputs information indicating a place where a human body with the quality value equal to or more than a threshold value is captured, or a partial image acquired by cutting the place out of the image.

Further, one aspect of the present invention provides an image processing method including, by one or more computers:

- performing processing of detecting a keypoint of a human body included in each of a plurality of images generated by a plurality of cameras capturing a same place:
- determining a same human body included in the plurality of images generated by the plurality of cameras:
- computing, for each human body, a quality value of the keypoint detected from the plurality of images generated by the plurality of cameras; and
- outputting information indicating a place where a human body with the quality value equal to or more than a threshold value is captured, or a partial image acquired by cutting the place out of the image.

Further, one aspect of the present invention provides a program causing a computer to function as:

- a skeleton structure detection unit that performs processing of detecting a keypoint of a human body included in each of a plurality of images generated by a plurality of cameras capturing a same place:

a determination unit that determines a same human body included in the plurality of images generated by the plurality of cameras:

a quality value computation unit that computes, for each human body, a quality value of the keypoint detected from the plurality of images generated by the plurality of cameras; and an output unit that outputs information indicating a place where a human body with the quality value equal to or more than a threshold value is captured, or a partial image acquired by cutting the place out of the image.

Advantageous Effects of Invention

According to one aspect of the present invention, an image processing apparatus, an image processing method, and a program that solve a problem of workability of work for preparing a template image of certain quality can be acquired.

BRIEF DESCRIPTION OF THE DRAWINGS

The above-described object, the other objects, features, and advantages will become more apparent from suitable example embodiment described below and the following accompanying drawings.

FIG. 8 is a diagram schematically illustrating one example of information output from the image processing apparatus.

EXAMPLE EMBODIMENT

Hereinafter, example embodiments of the present invention will be described with reference to the drawings. Note that, in all of the drawings, a similar component has a similar reference sign, and description thereof will be appropriately omitted.

First Example Embodiment

Figure 1:
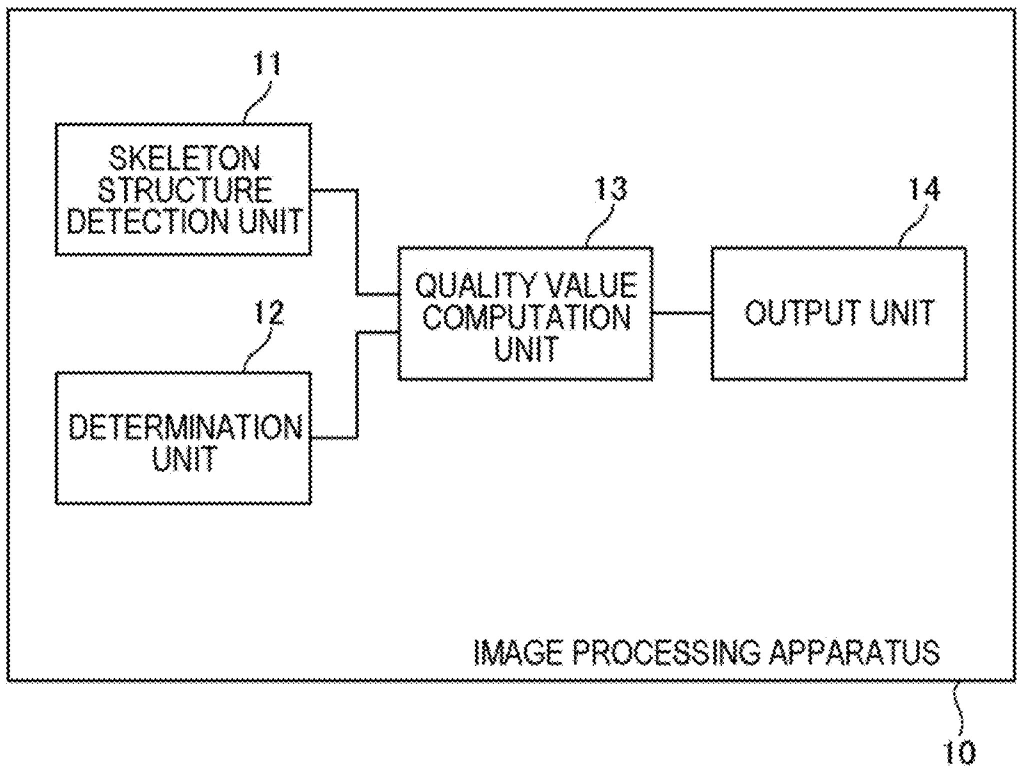
FIG. 1 is a diagram illustrating one example of a functional block diagram of an image processing apparatus.

FIG. 1 is a functional block diagram illustrating an overview of an image processing apparatus 10 according to a first example embodiment. As illustrated in FIG. 1, the image processing apparatus 10 includes a skeleton structure detection unit 11, a determination unit 12, a quality value computation unit 13, and an output unit 14. The skeleton structure detection unit 11 performs processing of detecting a keypoint of a human body included in each of a plurality of images generated by a plurality of cameras capturing the same place. The determination unit 12 determines the same human body included in the plurality of images generated by the plurality of cameras. The quality value computation unit 13 computes, for each human body, a quality value of the keypoint detected from the plurality of images generated by the plurality of cameras. The output unit 14 outputs information indicating a place where a human body with the quality value equal to or more than a threshold value is captured, or a partial image acquired by cutting the place out of the image.

The image processing apparatus 10 can solve a problem of workability of work for preparing a template image of certain quality.

Second Example Embodiment

"Overview"

An image processing apparatus 10 detects a keypoint of a human body included in each of a plurality of images generated by a plurality of cameras capturing the same place. Next, after the image processing apparatus 10 determines the same human body included in the plurality of images generated by the plurality of cameras, the image processing apparatus 10 computes, for each human body, a quality value of the detected keypoint, based on a value acquired by adding the number of the keypoints detected from each of the plurality of images generated by the plurality of cameras. Then, the image processing apparatus 10 outputs information indicating a place where a human body with the above-described quality value equal to or more than a threshold value is captured, or a partial image acquired by cutting the place out of the image.

A user can prepare a template image of certain quality by selecting the template image from the place where the human body with the above-described quality value equal to or more than the threshold value is captured.

"Hardware Configuration"

Next, one example of a hardware configuration of the image processing apparatus 10 will be described. The image processing apparatus 10 may be communicably connected to the plurality of cameras described above. Each functional unit of the image processing apparatus 10 is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like in addition to a program previously stored at a stage of shipping of an apparatus) such as a hard disk that stores the program, and a network connection interface. Then, various modification examples of an achievement method and an apparatus thereof are understood by a person skilled in the art.

Figure 2:
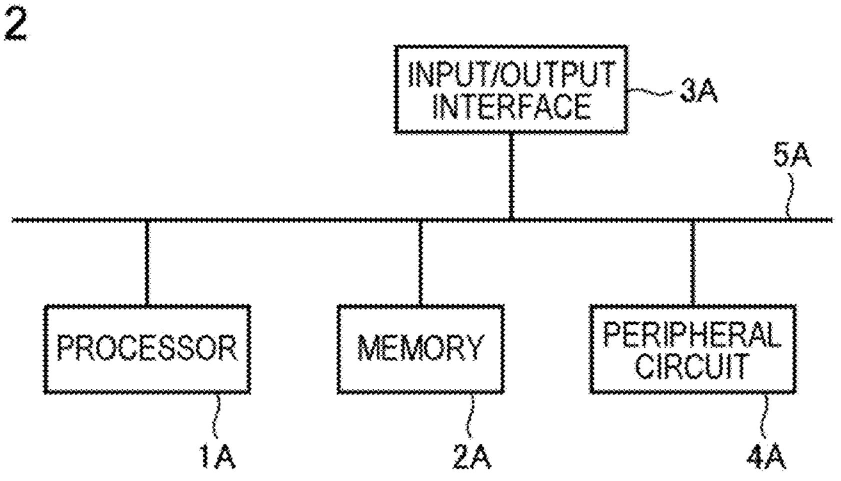
FIG. 2 is a diagram illustrating one example of a hardware configuration of the image processing apparatus.

FIG. 2 is a block diagram illustrating a hardware configuration of the image processing apparatus 10. As illustrated in FIG. 2, the image processing apparatus 10 includes a processor 1A, a memory 2A, an input/output interface 3A, a peripheral circuit 4A, and a bus 5A. Various modules are included in the peripheral circuit 4A. The image processing apparatus 10 may not include the peripheral circuit 4A. Note that the image processing apparatus 10 may be formed of a plurality of apparatuses being separated physically and/or logically. In this case, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

"Functional Configuration"

FIG. 1 is a functional block diagram illustrating an overview of the image processing apparatus 10 according to a second example embodiment. As illustrated in FIG. 1, the image processing apparatus 10 includes a skeleton structure detection unit 11, a determination unit 12, a quality value computation unit 13, and an output unit 14.

The skeleton structure detection unit 11 performs processing of detecting a keypoint of a human body included in each of a plurality of images generated by a plurality of cameras (two or more cameras) capturing the same place.

The plurality of cameras are installed in positions different from each other, and simultaneously capture the same place from angles different from each other. A place to be captured is not limited. For example, a place to be captured may be the inside of a vehicle such as a bus and a train, may be the inside of a building and a vicinity of an entrance, may be the inside of an outdoor facility such as a park and a vicinity of an entrance, and may be an outdoor place such as an intersection.

An "image" is an image being an original of a template image. The template image is an image being preregistered in the technique disclosed in Patent Document 1 described above, and is an image including a human body with a desired pose and a desired movement (a pose and a movement desired to be detected by a user). The image may be a moving image formed of a plurality of frame images, and may be a still image formed of one image.

The skeleton structure detection unit 11 detects N (N is an integer of two or more) keypoints of a human body included in an image. In a case where a moving image is a processing target, the skeleton structure detection unit 11 performs processing of detecting a keypoint for each frame image. The processing by the skeleton structure detection unit 11 is achieved by using the technique disclosed in Patent Document 1. Although details will be omitted, in the technique disclosed in Patent Document 1, detection of a skeleton structure is performed by using a skeleton estimation technique such as OpenPose disclosed in Non-Patent Document 1. A skeleton structure detected in the technique is formed of a "keypoint" being a characteristic point such as a joint and a "bone (bone link)" indicating a link between keypoints.

Figure 3:
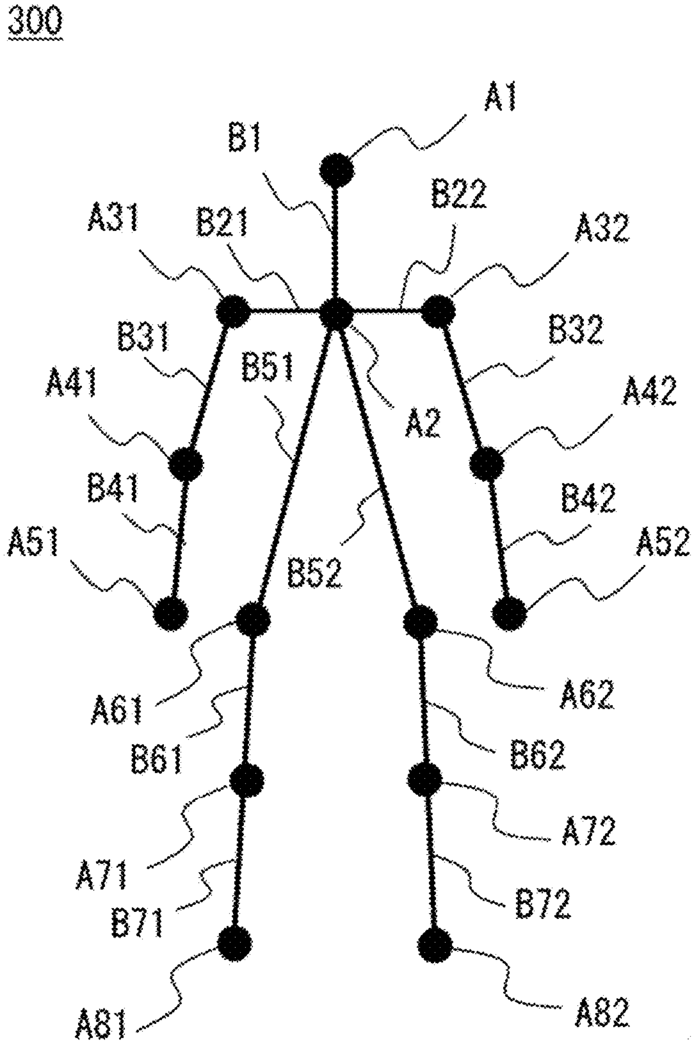
FIG. 3 is a diagram illustrating one example of a skeleton structure of a human model detected by the image processing apparatus.
Figure 4:
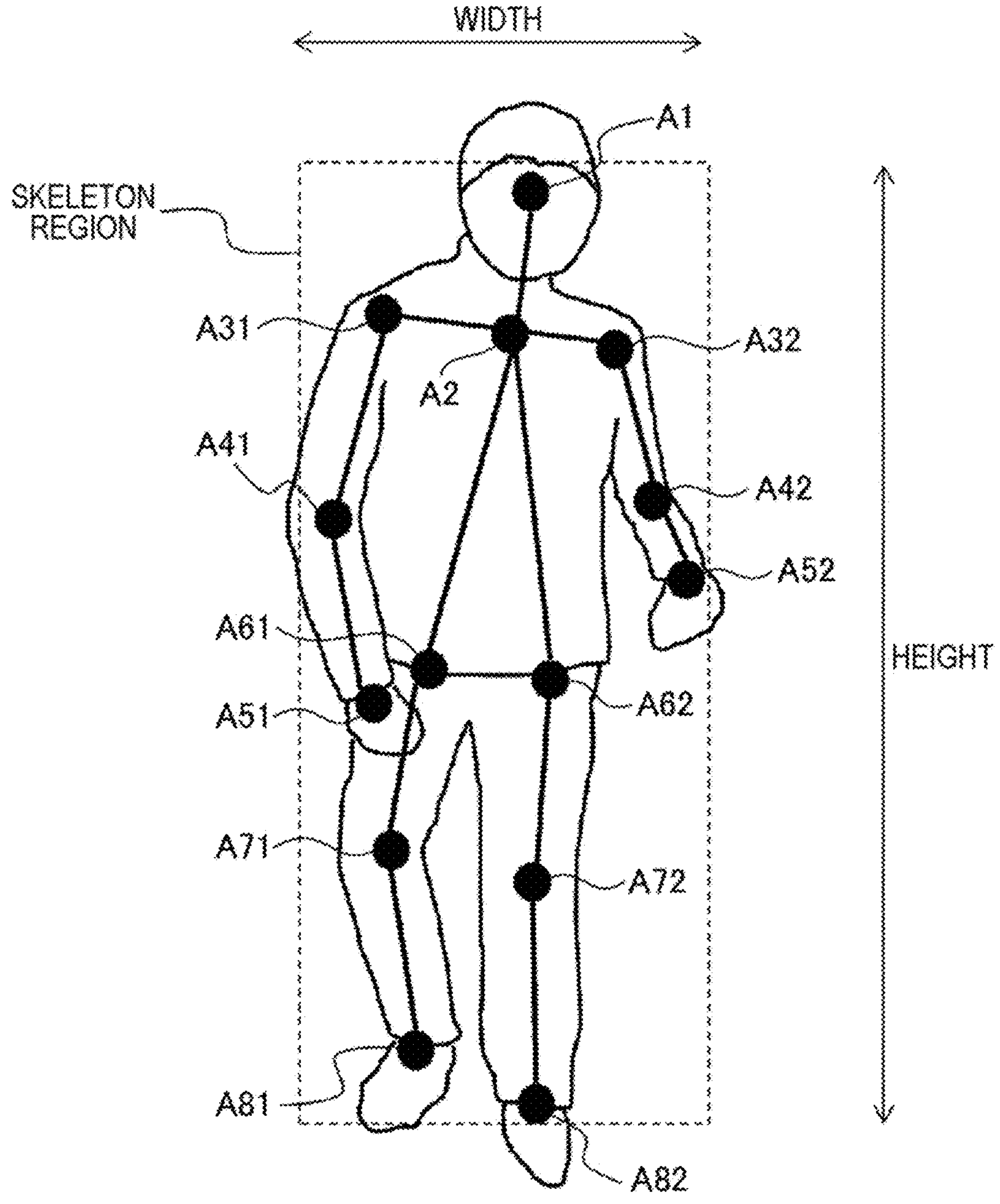
FIG. 4 is a diagram illustrating one example of a skeleton structure of a human model detected by the image processing apparatus.
Figure 5:
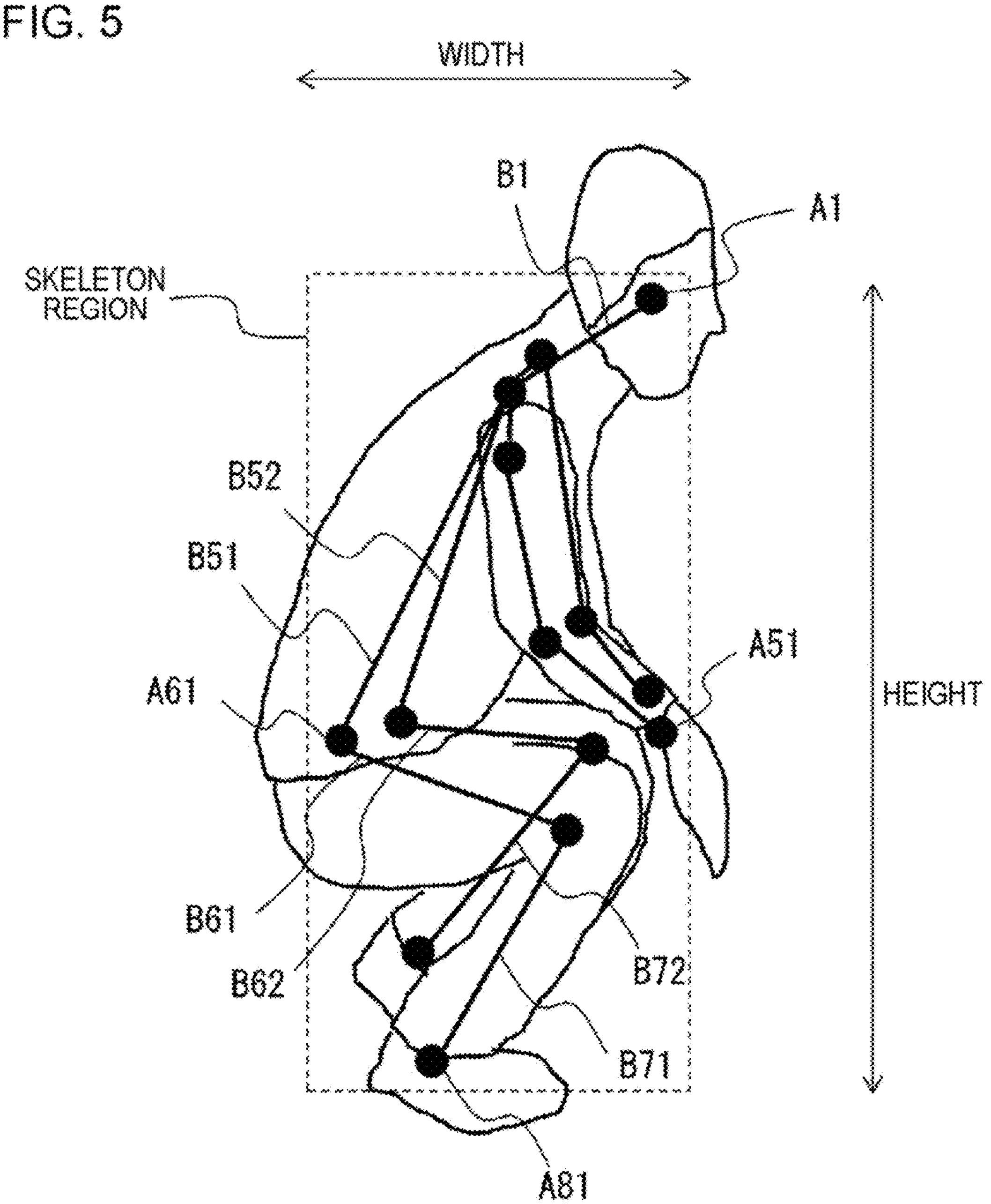
FIG. 5 is a diagram illustrating one example of a skeleton structure of a human model detected by the image processing apparatus.

FIG. 3 illustrates a skeleton structure of a human model 300 detected by the skeleton structure detection unit 11. FIGS. 4 and 5 illustrate a detection example of the skeleton structure. The skeleton structure detection unit 11 detects the skeleton structure of the human model (two-dimensional skeleton model) 300 as in FIG. 3 from a two-dimensional image by using a skeleton estimation technique such as OpenPose. The human model 300 is a two-dimensional model formed of a keypoint such as a joint of a person and a bone connecting keypoints.

For example, the skeleton structure detection unit 11 extracts a feature point that may be a keypoint from an image, refers to information acquired by performing machine learning on the image of the keypoint, and detects N keypoints of a human body. The detected N keypoints are predetermined. There is variety in the number (i.e., the number of N) of detected keypoints and which portion of a human body a keypoint is used to detect, and various variations can be adopted.

Hereinafter, as illustrated in FIG. 3, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are assumed to be determined as N keypoints (N=14) of a detection target. Note that, in the human model 300 illustrated in FIG. 3, as a bone of the person connecting the keypoints, a bone Bl connecting the head A1 and the neck A2, a bone B21 connecting the neck A2 and the right shoulder A31, a bone B22 connecting the neck A2 and the left shoulder A32, a bone B31 connecting the right shoulder A31 and the right elbow A41, a bone B32 connecting the left shoulder A32 and the left elbow A42, a bone B41 connecting the right elbow A41 and the right hand A51, a bone B42 connecting the left elbow A42 and the left hand A52, a bone B51 connecting the neck A2 and the right waist A61, a bone B52 connecting the neck A2 and the left waist A62, a bone B61 connecting the right waist A61 and the right knee A71, a bone B62 connecting the left waist A62 and the left knee A72, a bone B71 connecting the right knee A71 and the right foot A81, and a bone B72 connecting the left knee A72 and the left foot A82 are further predetermined.

FIG. 4 is an example of detecting a person in an upright state. In FIG. 4, the upright person is captured from the front, the bone B1, the bone B51 and the bone B52, the bone B61 and the bone B62, and the bone B71 and the bone B72 that are viewed from the front are each detected without overlapping, and the bone B61 and the bone B71 of a right leg are bent slightly more than the bone B62 and the bone B72 of a left leg.

FIG. 5 is an example of detecting a person in a squatting state. In FIG. 5, the squatting person is captured from a right side, the bone B1, the bone B51 and the bone B52, the bone B61 and the bone B62, and the bone B71 and the bone B72 that are viewed from the right side are each detected, and the bone B61 and the bone B71 of a right leg and the bone B62 and the bone B72 of a left leg are greatly bent and also overlap.

Returning to FIG. 1, the determination unit 12 determines the same human body included in the plurality of images generated by the plurality of cameras. The same human body is a human body of the same person. As described above, a plurality of images generated by a plurality of cameras are generated by the plurality of cameras simultaneously capturing the same place. Thus, there is a possibility that the same person may be captured across the plurality of images.

There are various units that determine the same person captured across a plurality of images. For example, the same person captured across a plurality of images may be determined by using a face authentication technique and the like, and a human body detected in a position in each of the plurality of images in which the same person is captured may be determined as the same human body.

Note that, in a case where an image is a moving image, the same human body captured across a plurality of frame images of one moving image can be further determined by a technique similar to the above-described technique, or a combination with a person tracking technique and the like.

The quality value computation unit 13 computes, for each human body, a quality value of the keypoint detected from the plurality of images generated by the plurality of cameras. Further, the quality value computation unit 13 decides whether the quality value of the detected keypoint is equal to or more than a threshold value for each detected human body. Then, the quality value computation unit 13 determines, according to a determination result, a place in the image where a human body with the quality value of the detected keypoint equal to or more than the threshold value is captured. The processing will be described below in detail.

—Processing of Computing Quality Value of Detected Keypoint—

The quality value computation unit 13 computes a quality value for each human body. For example, in a case where a human body of a person A is captured in a first image and a second image, the quality value computation unit 13 computes one quality value in association with the human body of the person A instead of separately computing a quality value of the human body of the person A captured in the first image and a quality value of the human body of the person A captured in the second image.

Figure 6:
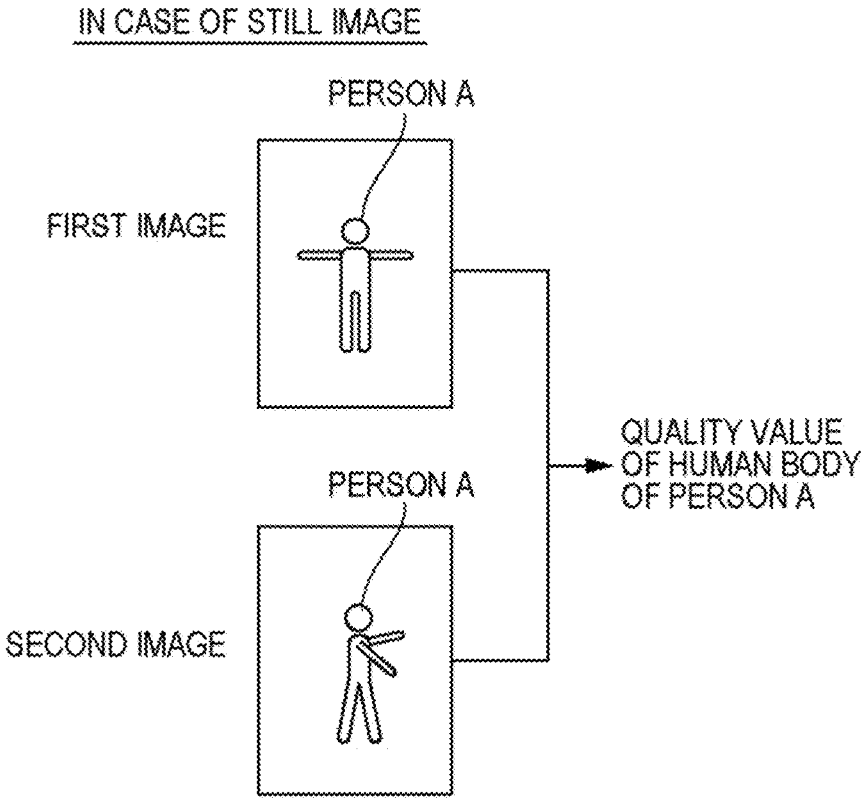
FIG. 6 is a diagram illustrating one example of processing of computing a quality value from a plurality of still images.

As illustrated in FIG. 6, in a case where an image is a still image, a quality value of the human body of the person A is computed based on a plurality of still images.

Figure 7:
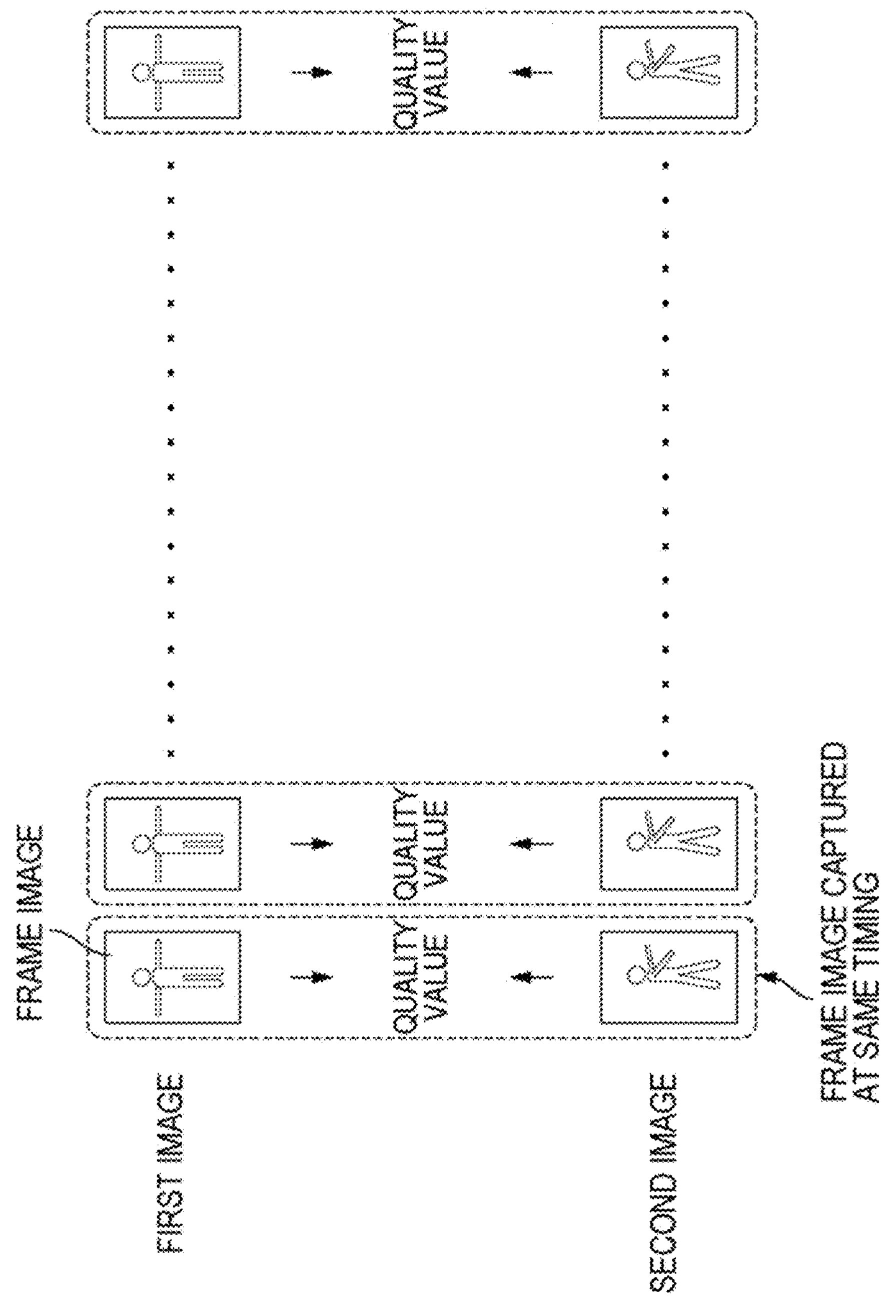
FIG. 7 is a diagram illustrating one example of processing of computing a quality value from a plurality of moving images.

As illustrated in FIG. 7, in a case where an image is a moving image, the quality value computation unit 13 determines a plurality of frame images captured at the same timing with each other among a plurality of moving images, based on a time stamp provided to the moving image. Then, the quality value computation unit 13 computes the above-described quality value for each combination of the plurality of frame images captured at the same timing with each other.

A "quality value of a detected keypoint" is a value indicating how good quality of the detected keypoint is, and can be computed based on various types of data. In the present example embodiment, the quality value computation unit 13 computes a quality value, based on a value acquired by adding the number of keypoints detected from each of a plurality of images. The quality value computation unit 13 computes a higher quality value with a greater value acquired by adding the number of keypoints detected from each of a plurality of images. For example, the quality value computation unit 13 may compute, as a quality value, a value acquired by adding the number of keypoints detected from each of a plurality of images, and may compute, as a quality value, a value acquired by normalizing the added value by a predetermined rule.

Herein, the above-described quality value will be described by using a specific example. In order to simplify the description, it is assumed that two images (first and second images) generated by two cameras capturing the same place are processed. For example, it is assumed that a $K_1$ ($K_1$ is an integer equal to or less than N) keypoint is detected from the human body of the person A captured in the first image, and a $K_2$ ($K_2$ is an integer equal to or less than N) keypoint is detected from the human body of the person A captured in the second image. In this case, the quality value computation unit 13 computes a quality value of the keypoint detected from the human body of the person A, based on $(K_1+K_2)$.

—Processing of Determining Place in Image where Human Body With Quality Value of Detected Keypoint Equal to or More Than Threshold Value is Captured—

The quality value computation unit 13 determines a place in an image where a human body with a quality value of a detected keypoint equal to or more than a threshold value is captured, based on a computation result of the processing of computing a quality value described above. The quality value computation unit 13 decides whether the quality value of the detected keypoint is equal to or more than the threshold value for each detected human body. Then, the quality value computation unit 13 determines a place where a human body with the quality value equal to or more than the threshold value is captured, according to a decision result.

In a case where an image is a still image, a "place where a human body with a quality value equal to or more than a threshold value" is a partial region in one still image. In this case, for each still image, a place in an image where a human body with a quality value of a detected keypoint equal to or more than the threshold value is captured is indicated by, for example, coordinates in a coordinate system set in the still image.

On the other hand, in a case where an image is a moving image, a "place where a human body with a quality value equal to or more than a threshold value" is a partial region in each frame image being a part of a plurality of frame images constituting the moving image. In this case, for each moving image, a place in an image where a human body with a quality value of a detected keypoint equal to or more than the threshold value is captured is indicated by, for example, information (such as frame identification information and an elapsed time from the beginning) indicating the frame image being a part of the plurality of frame images, and coordinates in a coordinate system set in the frame image.

Note that, in a case where an image is a moving image, it is preferable to determine a "place where a human body of the same person is continuously captured, and the human body is captured in each of a plurality of frame images satisfying a condition that a "quality value of a keypoint detected from the human body is equal to or more than a threshold value"".

As described above, in a case where an image is a moving image, the determination unit 12 can determine a human body of the same person captured across a plurality of frame images. The quality value computation unit 13 can determine the plurality of frame images in which the human body of the same person is continuously captured, based on a result of the determination.

Next, a condition that a "quality value of a keypoint detected from a human body is equal to or more than a threshold value" will be described. The condition may require that all of a plurality of determined frame images satisfy the condition. In other words, in a plurality of frame images determined by the quality value computation unit 13, a human body of the same person may be continuously captured, and a quality value of a keypoint detected from the human body may be equal to or more than a threshold value in all of the frame images.

In addition, the condition described above may require that at least a part of a plurality of determined frame images satisfies the condition described above. In other words, in a plurality of frame images determined by the quality value computation unit 13, a human body of the same person may be continuously captured, and a quality value of a keypoint detected from the human body may be equal to or more than a threshold value in at least a part of the frame images. In this case, as a condition of the plurality of frame images determined by the quality value computation unit 13, the "number of frame images in which a human body with a quality value less than a threshold value continues is equal to or less than Q", and the like may be further provided. By providing such an additional condition, an inconvenience that a human body with a low quality value continuously appears for a predetermined number of frames or more in the plurality of frame images determined by the quality value computation unit 13 can be suppressed.

The output unit 14 outputs information indicating a place where a human body with a quality value equal to or more than a threshold value (a human body with a quality value of a detected keypoint equal to or more than a threshold value) is captured, or a partial image acquired by cutting the place out of an image. In a case where an image is a moving image, the output unit 14 may output information indicating a place where a human body of the same person is continuously captured, and the human body is captured in each of a plurality of frame images satisfying a condition that a "quality value of a keypoint detected from the human body is equal to or more than a threshold value", or a partial image acquired by cutting the place out of the image.

Note that, in a case where the output unit 14 outputs a partial image, the image processing apparatus 10 can include a processing unit that generates a partial image by cutting, out of an image, a place where a human body with a quality value equal to or more than a threshold value is captured. Then, the output unit 14 can output the partial image generated by the processing unit.

Further, the output unit 14 may output a partial image cut out of a plurality of images generated by a plurality of cameras, by associating the partial images related to the same human body with each other. Further, the output unit 14 may output information indicating a place where a human body with a quality value equal to or more than a threshold value in each of a plurality of images generated by a plurality of cameras, by associating the pieces of information about the same human body with each other. Further, the output unit 14 may output information indicating that a human body with a quality value equal to or more than a threshold value is included in an image.

The "place in the image where the human body with the quality value equal to or more than the threshold value is captured" described above is a candidate for a template image. A user can select, as the template image, a place including a human body with a desired pose and a desired movement from the candidates by viewing a place where a human body with a quality value equal to or more than a threshold value is captured, based on the above-described information or the above-described partial image, and the like.

FIG. 8 schematically illustrates one example of information output from the output unit 14. In the example illustrated in FIG. 8, human body identification information for identifying a plurality of detected human bodies from each other and attribute information about each of the human bodies are associated with each other. Then, as one example of the attribute information, a quality value, the number of detected keypoints, information indicating a place in an image (information indicating a place where the human body described above is captured), and a date and time of capturing of the image are displayed. The number of detected keypoints is a value acquired by adding the number of keypoints detected from each of a plurality of images. In addition, the attribute information may include information (for example: rear in Bus No. 102, an entrance ○○ Park, and the like) indicating an installation position (capturing position) of a camera that captures the image, and attribute information (for example: gender, an age group, a body type, and the like) about a person computed by an image analysis.

Figure 9:
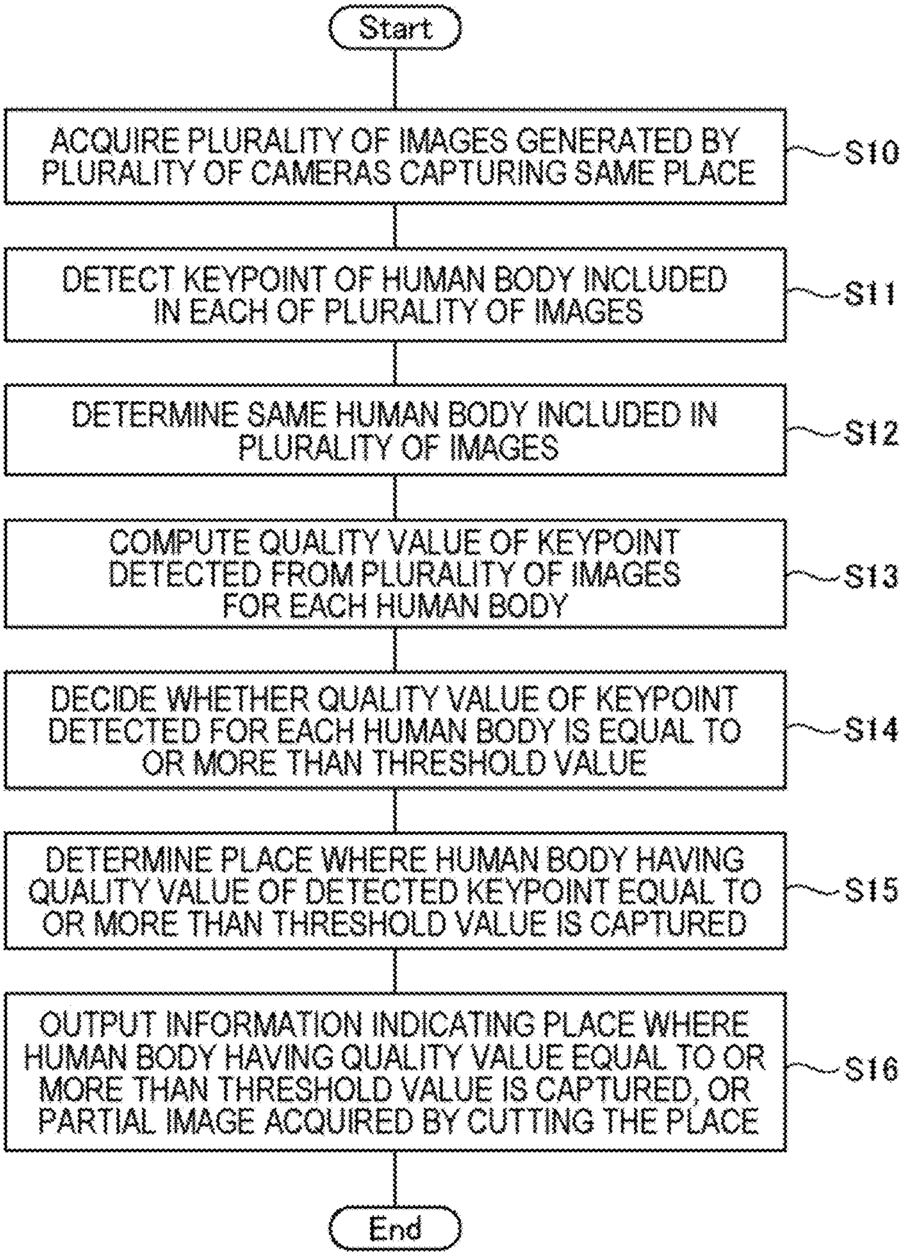
FIG. 9 is a flowchart illustrating one example of a flow of processing of the image processing apparatus.

Next, one example of a flow of processing of the image processing apparatus 10 will be described by using a flowchart in FIG. 9.

After the image processing apparatus 10 acquires a plurality of images generated by a plurality of cameras capturing the same place (S10), the image processing apparatus 10 performs processing of detecting a keypoint of a human body included in each of the plurality of images (S11). Next, the image processing apparatus 10 determines the same human body included in the plurality of images generated by the plurality of cameras (S12). Note that, a processing order of S11 and S12 may be reversed, or the two pieces of processing may be simultaneously performed.

Next, the image processing apparatus 10 computes, for each human body, a quality value of the keypoint detected from the plurality of images generated by the plurality of cameras (S13). In the second example embodiment, the image processing apparatus 10 computes a quality value, based on a value acquired by adding the number of the keypoints detected from each of the plurality of images generated by the plurality of cameras. The image processing apparatus 10 computes a higher quality value with a higher value acquired by the addition.

Next, the image processing apparatus 10 decides whether the quality value of the detected keypoint is equal to or more than a threshold value for each human body (S14). Next, the image processing apparatus 10 determines a place in the image where a human body with the quality value of the detected keypoint equal to or more than the threshold value is captured, according to a decision result in S14 (S15). Then, the image processing apparatus 10 outputs information indicating the place where the human body with the quality value equal to or more than the threshold value is captured, or a partial image acquired by cutting the place out of the image (S16). For example, the image processing apparatus 10 may output a partial image cut out of a plurality of images generated by a plurality of cameras, by associating the partial images related to the same human body with each other. Further, the image processing apparatus 10 may output information indicating a place where a human body with a quality value equal to or more than a threshold value in each of a plurality of images generated by a plurality of cameras, by associating the pieces of information about the same human body with each other.

"Advantageous Effect"

The image processing apparatus 10 according to the second example embodiment can achieve an advantageous effect similar to that in the first example embodiment. Further, the image processing apparatus 10 according to the second example embodiment can provide, as a candidate for a template image to a user, a place where a human body with a great value acquired by adding the number of keypoints detected from each of a plurality of images generated by a plurality of cameras is captured. By selecting the template image from among the candidates for the template image provided in such a manner, the user can easily prepare the template image in which the value acquired by adding the number of the keypoints detected from each of the plurality of images satisfies certain quality.

Figure 10:
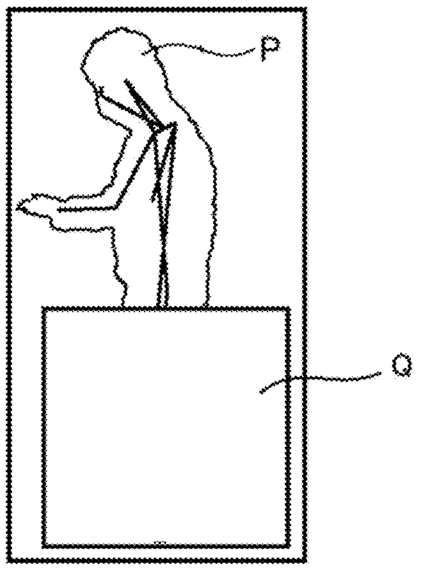
FIG. 10 is a diagram illustrating an advantageous effect of the image processing apparatus.
Figure 11:
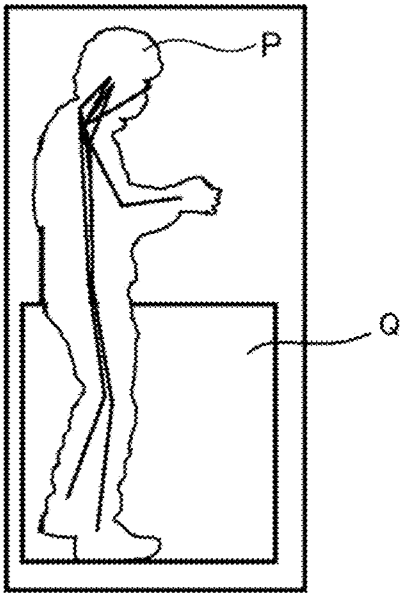
FIG. 11 is a diagram illustrating an advantageous effect of the image processing apparatus.

Further, as illustrated in FIG. 10, there is a case where a keypoint of a part of a human body P is not detected due to the part being hidden by an obstacle Q or another portion of his/her own human body P. An image of a human body with many keypoints being undetected is not preferable as a template image. However, as illustrated in FIG. 11, in a case where the undetected keypoint is detected in an image generated by another camera, a shortage can be complemented by a feature value of a keypoint detected from the other image. In this way, there is a case where only one image is not preferable as a template image, but is preferable as a template image in a case where a plurality of images captured at the same timing are combined. As in the image processing apparatus 10, by computing, for each human body, a quality value of a keypoint detected from a plurality of images generated by a plurality of cameras, and selecting a candidate for a template image, based on the quality value, an image of a human body being preferable as the template image in a case where a plurality of images captured at the same timing as described above are combined can be selected as a candidate for the template image.

Third Example Embodiment

An image processing apparatus 10 according to a third example embodiment is different from the first and second example embodiments in a way of computing a quality value.

A quality value computation unit 13 computes a quality value, based on the number of keypoints detected in at least one of a plurality of images generated by a plurality of cameras among a plurality of keypoints (N keypoints described above) being a detection target, or the number of keypoints not being detected in any of the plurality of images generated by the plurality of cameras among the plurality of keypoints being the detection target.

The quality value computation unit 13 computes a higher quality value with a greater number of keypoints detected in at least one of a plurality of images generated by a plurality of cameras among a plurality of keypoints being a detection target. For example, the quality value computation unit 13 may compute, as a quality value, the number of keypoints detected in at least one of the plurality of images generated by the plurality of cameras among the plurality of keypoints being the detection target, and may compute, as a quality value, a value acquired by normalizing the number by a predetermined rule.

Further, the quality value computation unit 13 computes a higher quality value with a smaller number of keypoints not being detected in any of the plurality of images generated by the plurality of cameras among the plurality of keypoints being the detection target. For example, the quality value computation unit 13 may compute, as a quality value, a number acquired by subtracting the number of keypoints not being detected in any of the plurality of images generated by the plurality of cameras among the plurality of keypoints being the detection target from a predetermined value, and may compute, as a quality value, a value acquired by normalizing the number by a predetermined rule.

Herein, the above-described quality value will be described by using a specific example. In order to simplify the description, it is assumed that two images (first and second images) generated by two cameras capturing the same place are processed. Further, a plurality of keypoints being a detection target are assumed to be five of $C_1$ to $C_5$. It is assumed that the keypoints $C_1$ to $C_3$ are detected from the first image and the keypoints $C_2$ to $C_4$ are detected from the second image. In this case, keypoints detected in at least one of a plurality of images generated by a plurality of cameras among the plurality of keypoints being the detection target are the keypoints $C_1$ to $C_4$, and the number is "4". Then, a keypoint not being detected in any of the plurality of images generated by the plurality of cameras among the plurality of keypoints being the detection target is the keypoint $C_5$, and the number is "1". The quality value computation unit 13 computes a quality value of the keypoint detected from the human body, based on the number.

In addition, the quality value computation unit 13 may compute a quality value by combining the technique described in the second example embodiment with the above-described technique based on the number of keypoints detected in at least one of a plurality of images generated by a plurality of cameras among a plurality of keypoints being a detection target, or the number of keypoints not being detected in any of the plurality of images generated by the plurality of cameras among the plurality of keypoints being the detection target. For example, the quality value computation unit 13 computes a first quality value by normalizing, by a predetermined rule, a quality value computed by the technique described in the second example embodiment, and also computes a second quality value by normalizing, by a predetermined rule, a quality value computed by the above-described technique based on the number of keypoints detected in at least one of a plurality of images generated by a plurality of cameras among a plurality of keypoints being a detection target, or the number of keypoints not being detected in any of the plurality of images generated by the plurality of cameras among the plurality of keypoints being the detection target. Then, the quality value computation unit 13 may compute, as a quality value of a human body, a statistic (such as an average value, a maximum value, a minimum value, a medium value, a mode, and a weighted average value) of the first quality value and the second quality value.

Another configuration of the image processing apparatus 10 according to the third example embodiment is similar to that in the first and second example embodiments.

The image processing apparatus 10 according to the third example embodiment can achieve an advantageous effect similar to that in the first and second example embodiments. Further, the image processing apparatus 10 according to the third example embodiment can provide, as a candidate for a template image to a user, a place where a human body with a great number of keypoints detected in at least one image among N keypoints being a detection By selecting the template image from among the candidates target is captured. for the template image provided in such a manner, the user can easily prepare the template image in which the number of the keypoints detected in at least one image satisfies certain quality.

Fourth Example Embodiment

An image processing apparatus 10 according to a fourth example embodiment is different from the first to third example embodiments in a way of computing a quality value.

Figure 12:
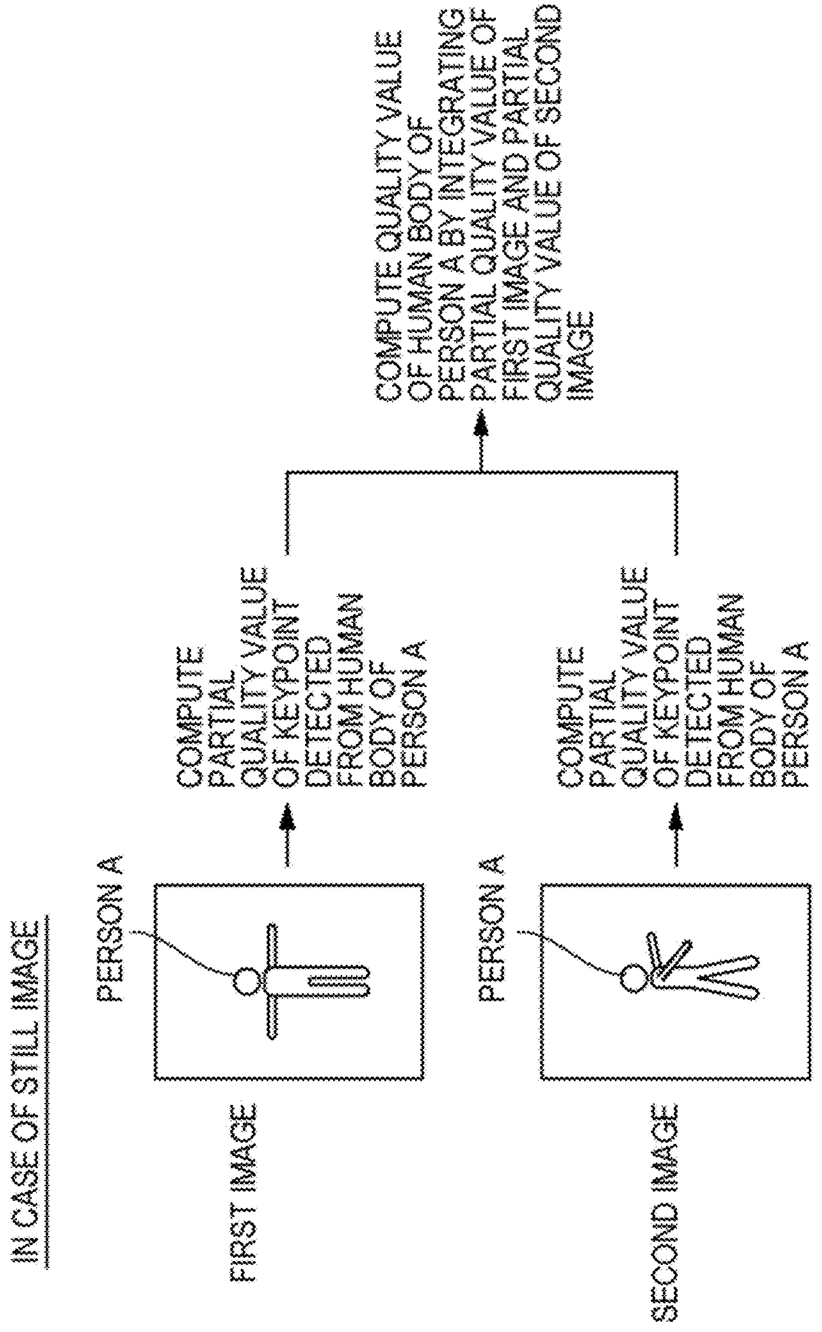
FIG. 12 is a diagram illustrating one example of processing of computing a partial quality value from a plurality of still images, and computing a quality value.

A quality value computation unit 13 computes, for each image, a partial quality value of a keypoint detected from each of a plurality of images generated by a plurality of cameras, and computes a quality value for each human body by integrating the partial quality value for each image. As illustrated in FIG. 12, in a case where an image is a still image, the quality value computation unit 13 computes a partial quality value for each human body detected from each of a plurality of images. Then, the quality value computation unit 13 computes a quality value of a human body of the same person by integrating the partial quality value of the human body of the same person.

Figure 13:
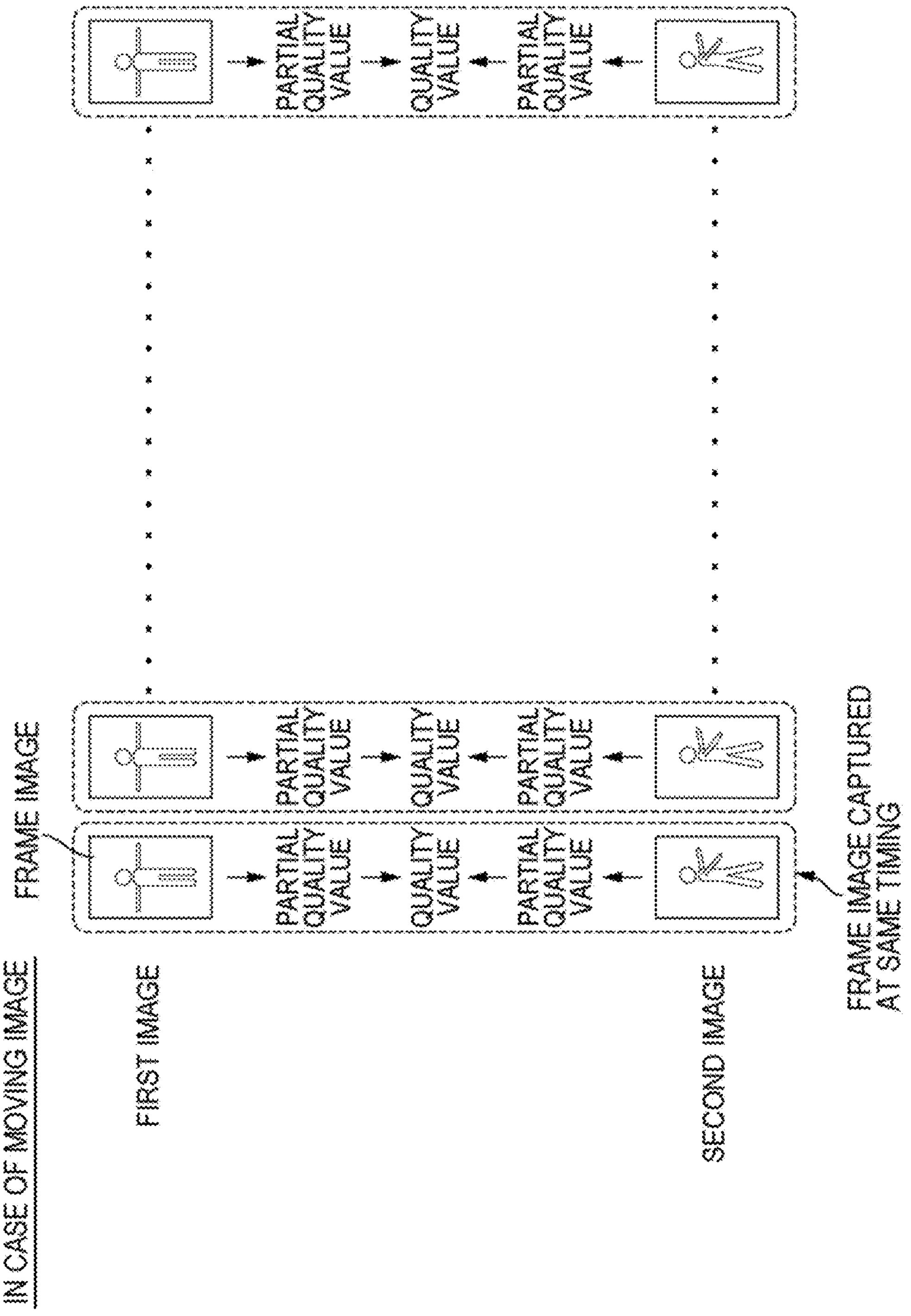
FIG. 13 is a diagram illustrating one example of processing of computing a partial quality value from a plurality of moving images, and computing a quality value.

As illustrated in FIG. 13, in a case where an image is a moving image, the quality value computation unit 13 determines a plurality of frame images captured at the same timing with each other among a plurality of moving images, based on a time stamp provided to the moving image. Then, the quality value computation unit 13 computes, for each combination of the plurality of frame images captured at the same timing with each other, a quality value of a human body of the same person by integrating a partial quality value of the human body of the same person detected from each of the plurality of frame images.

A "partial quality value of a detected keypoint" is a value indicating how good quality of the detected keypoint is, and can be computed based on various types of data. In the present example embodiment, the quality value computation unit 13 computes a partial quality value, based on a confidence factor of a detection result of a keypoint. In the following example embodiment, an example of computing the above-described partial quality value, based on data other than a confidence factor of a detection result of a keypoint, will be described. A computation method of the confidence factor is not particularly limited. For example, in a skeleton estimation technique such as OpenPose, a score output in association with each detected keypoint may be set as a confidence factor of each keypoint.

The quality value computation unit 13 computes a higher partial quality value with a higher confidence factor of a detection result of a keypoint. For example, the quality value computation unit 13 may compute, as a partial quality value of a human body, a statistic (such as an average value, a maximum value, a minimum value, a medium value, a mode, and a weighted average value) of a confidence factor of each of N keypoints detected from the human body. In a case where a part of the N keypoints is not detected, a confidence factor of the keypoint not being detected may be set to a fixed value such as "0". The fixed value is assumed to be a value lower than the confidence factor of the detected keypoint.

Note that, in a case where an image is a still image, the quality value computation unit 13 computes a partial quality value for each human body detected from the still image. On the other hand, in a case where an image is a moving image, the quality value computation unit 13 computes a partial quality value for each human body detected from each of a plurality of frame images.

Next, processing of computing a quality value by integrating a partial quality value of a keypoint detected from each of a plurality of images generated by a plurality of cameras will be described. The quality value computation unit 13 can compute, as a quality value of a human body, a statistic (such as an average value, a maximum value, a minimum value, a medium value, a mode, and a weighted average value) of the partial quality value of the keypoint detected from each of the plurality of images generated by the plurality of cameras.

In addition, the quality value computation unit 13 may compute a quality value by combining at least one of the techniques described in the second and third example embodiments with the above-described technique based on a confidence factor of a detection result of a keypoint. For example, the quality value computation unit 13 performs at least one of processing of computing a first quality value by normalizing, by a predetermined rule, a quality value computed by the technique described in the second example embodiment, and processing of computing a second quality value by normalizing, by a predetermined rule, a quality value computed by the technique described in the third example embodiment. Further, the quality value computation unit 13 computes a third quality value by normalizing, by a predetermined rule, a quality value computed by the above-described technique based on a confidence factor of a detection result of a keypoint. Then, the quality value computation unit 13 may compute, as a quality value of a human body, a statistic (such as an average value, a maximum value, a minimum value, a medium value, a mode, and a weighted average value) of at least one of the first quality value and the second quality value, and the third quality value.

Another configuration of the image processing apparatus 10 according to the fourth example embodiment is similar to that in the first to third example embodiments.

The image processing apparatus 10 according to the fourth example embodiment can achieve an advantageous effect similar to that in the first to third example embodiments. Further, the image processing apparatus 10 according to the fourth example embodiment can provide, as a candidate for a template image to a user, a place where a human body with a high confidence factor of a detection result of a keypoint is captured. By selecting the template image from among the candidates for the template image provided in such a manner, the user can easily prepare the template image in which the confidence factor of the detection result of the keypoint satisfies certain quality.

Fifth Example Embodiment

An image processing apparatus 10 according to a fifth example embodiment is different from the first to fourth example embodiments in a way of computing a quality value.

A quality value computation unit 13 computes, for each image, a partial quality value of a keypoint detected from each of a plurality of images generated by a plurality of cameras, and computes a quality value for each human body by integrating the partial quality value for each image. Then, the quality value computation unit 13 computes a partial quality value of a human body with a relatively great number of detected keypoints to be higher than a partial quality value of a human body with a relatively small number of detected keypoints. For example, the quality value computation unit 13 may set the number of detected keypoints as a partial quality value. In addition, a weighted point may be set for each of a plurality of keypoints. A higher weighted point is set for a relatively more important keypoint. Then, the quality value computation unit 13 may compute, as a partial quality value, a value acquired by adding the weighted point of each detected keypoint.

In addition, the quality value computation unit 13 may compute a quality value by combining at least one of the techniques described in the second to fourth example embodiments with the above-described technique based on the number of keypoints. For example, the quality value computation unit 13 performs at least one of processing of computing a first quality value by normalizing, by a predetermined rule, a quality value computed by the technique described in the second example embodiment, processing of computing a second quality value by normalizing, by a predetermined rule, a quality value computed by the technique described in the third example embodiment, and processing of computing a third quality value by normalizing, by a predetermined rule, a quality value computed by the technique described in the fourth example embodiment. Further, the quality value computation unit 13 computes a fourth quality value by normalizing, by a predetermined rule, a quality value computed by the above-described technique based on the number of keypoints. Then, the quality value computation unit 13 may compute, as a quality value of a human body, a statistic (such as an average value, a maximum value, a minimum value, a medium value, a mode, and a weighted average value) of at least one of the first to third quality values, and the fourth quality value.

Another configuration of the image processing apparatus 10 according to the fifth example embodiment is similar to that in the first to fourth example embodiments.

The image processing apparatus 10 according to the fifth example embodiment can achieve an advantageous effect similar to that in the first to fourth example embodiments. Further, the image processing apparatus 10 according to the fifth example embodiment can provide, as a candidate for a template image to a user, a place where a human body with a great number of keypoints detected is captured. By selecting the template image from among the candidates for the template image provided in such a manner, the user can easily prepare the template image in which the number of the detected keypoints satisfies certain quality.

Sixth Example Embodiment

An image processing apparatus 10 according to a sixth example embodiment is different from the first to fifth example embodiments in a way of computing a quality value.

A quality value computation unit 13 computes, for each image, a partial quality value of a keypoint detected from each of a plurality of images generated by a plurality of cameras, and computes a quality value for each human body by integrating the partial quality value for each image. Then, the quality value computation unit 13 computes a partial quality value, based on a degree of overlapping with another human body. Note that, a "state where a human body of a person A overlaps a human body of a person B" includes a state where the human body of the person A is partially or entirely hidden by the human body of the person B, a state where the human body of the person A partially or entirely hide the human body of the person B, and a state where both of the states occur. Hereinafter, a technique of the computation will be specifically described.

—First Technique—

The quality value computation unit 13 computes a partial quality value of a human body not overlapping another human body to be higher than a partial quality value of a human body overlapping another human body. For example, a rule in which a partial quality value of a human body not overlapping another human body is $X_1$ and a partial quality value of a human body overlapping another human body is $X_2$ is created in advance and stored in the image processing apparatus 10. Note that, $X_1>X_2$. Then, the quality value computation unit 13 computes a partial quality value of a human body not overlapping another human body as $X_1$, and computes a partial quality value of a human body overlapping another human body as $X_2$, based on the rule.

Whether a human body overlaps another human body may be determined based on a degree of overlapping of the human model 300 (see FIG. 3) detected by a skeleton structure detection unit 11, and may be determined based on a degree of overlapping of a body captured in an image.

For example, in a case where a distance in an image between predetermined keypoints (for example: a head A1) of two human bodies is equal to or less than a threshold value, it may be decided that the two human bodies overlap each other. In this case, the threshold value may be a variable value changing according to a size of a detected human body in an image. The threshold value increases with a greater size of a detected human body in an image. Note that, a length of a predetermined bone (for example: a bone BI connecting the head A1 and a neck A2), a size of a face in an image, and the like may be adopted instead of a size of a human body in an image.

In addition, in a case where any bone of a certain human body crosses any bone of another human body, the two human bodies may be decided to overlap each other.

—Second Technique—

The quality value computation unit 13 computes a partial quality value of a human body not overlapping another human body to be higher than a partial quality value of a human body overlapping another human body, and also computes a partial quality value of a human body located in front to be higher than a partial quality value of a human body located in rear among human bodies overlapping another human body.

In other words, the quality value computation unit 13 computes a partial quality value of a human body not overlapping another human body to be highest, computes a partial quality value of a human body overlapping another human body but being located in front to be next highest, and computes a partial quality value of a human body overlapping another human body and being located in rear to be lowest.

For example, a rule in which a partial quality value of a human body not overlapping another human body is $X_1$, a partial quality value of a human body overlapping another human body and being located in front is $X_{21}$, and a partial quality value of a human body overlapping another human body and being located in rear is $X_{22}$ is created in advance and stored in the image processing apparatus 10. Note that, $X_1>X_{21}>X_{22}$. Then, the quality value computation unit 13 computes a partial quality value of a human body not overlapping another human body to be $X_1$, computes a partial quality value of a human body overlapping another human body and being located in front to be $X_{21}$, and computes a partial quality value of a human body overlapping another human body and being located in rear to be $X_{22}$, based on the rule.

Whether a human body is located in front or rear of another human body may be determined based on a hidden degree or a missing degree of the human model 300 (see FIG. 3) detected by the skeleton structure detection unit 11, and may be determined based on a hidden degree of a body captured in an image. For example, in a case where all N keypoints are detected from one of two human bodies overlapping each other, and only a part of N keypoints is detected from the other, it can be determined that the human body from which all the N keypoints are detected is located in front, and the other human body is located in rear.

In addition, the quality value computation unit 13 may compute a quality value by combining at least one of the techniques described in the second to fifth example embodiments with the above-described technique based on a degree of overlapping of a human body. For example, the quality value computation unit 13 performs at least one of processing of computing a first quality value by normalizing, by a predetermined rule, a quality value computed by the technique described in the second example embodiment, processing of computing a second quality value by normalizing, by a predetermined rule, a quality value computed by the technique described in the third example embodiment, processing of computing a third quality value by normalizing, by a predetermined rule, a quality value computed by the technique described in the fourth example embodiment, and processing of computing a fourth quality value by normalizing, by a predetermined rule, a quality value computed by the technique described in the fifth example embodiment. Further, the quality value computation unit 13 computes a fifth quality value by normalizing, by a predetermined rule, a quality value computed by the above-described technique based on a degree of overlapping of a human body. Then, the quality value computation unit 13 may compute, as a quality value of a human body, a statistic (such as an average value, a maximum value, a minimum value, a medium value, a mode, and a weighted average value) of at least one of the first to fourth quality values, and the fifth quality value.

Another configuration of the image processing apparatus 10 according to the sixth example embodiment is similar to that in the first to fifth example embodiments.

The image processing apparatus 10 according to the sixth example embodiment can achieve an advantageous effect similar to that in the first to fifth example embodiments. Further, the image processing apparatus 10 according to the sixth example embodiment can provide, as a candidate for a template image to a user, a place where a human body not overlapping another human body is captured, and a place where a human body overlapping another human body but being located in front is captured. By selecting the template image from among the candidates for the template image provided in such a manner, the user can easily prepare the template image in which a degree of overlapping with another human body satisfies certain quality.

Seventh Example Embodiment

An image processing apparatus 10 according to a seventh example embodiment is different from the first to sixth example embodiments in a way of computing a quality value.

First, a skeleton structure detection unit 11 performs processing of detecting a person region in an image, and detecting a keypoint in the detected person region. In other words, the skeleton structure detection unit 11 sets only a detected person region as a target for the processing of detecting a keypoint instead of setting all regions in an image as a target for the processing of detecting a keypoint. Details of the processing of detecting a person region in an image are not particularly limited, and the processing may be achieved by using an object detection technique such as YOLO, for example.

A quality value computation unit 13 computes, for each image, a partial quality value of a keypoint detected from each of a plurality of images generated by a plurality of cameras, and computes a quality value for each human body by integrating the partial quality value for each image. Then, the quality value computation unit 13 computes a partial quality value, based on a confidence factor of a detection result of the person region described above. A computation method of a confidence factor of a detection result of a person region is not particularly limited. For example, in an object detection technique such as YOLO, a score (may also be referred to as a degree of reliability and the like) output in association with a detected object region may be set as a confidence factor of each person region.

The quality value computation unit 13 computes a higher partial quality value with a higher confidence factor of a detection result of a person region. For example, the quality value computation unit 13 may compute a confidence factor of a detection result of a person region as a partial quality value.

In addition, the quality value computation unit 13 may compute a quality value by combining at least one of the techniques described in the second to sixth example embodiments and the above-described technique based on a confidence factor of a detection result of a person region. For example, the quality value computation unit 13 performs at least one of processing of computing a first quality value by normalizing, by a predetermined rule, a quality value computed by the technique described in the second example embodiment, processing of computing a second quality value by normalizing, by a predetermined rule, a quality value computed by the technique described in the third example embodiment, processing of computing a third quality value by normalizing, by a predetermined rule, a quality value computed by the technique described in the fourth example embodiment, processing of computing a fourth quality value by normalizing, by a predetermined rule, a quality value computed by the technique described in the fifth example embodiment, and processing of computing a fifth quality value by normalizing, by a predetermined rule, a quality value computed by the technique described in the sixth example embodiment. Further, the quality value computation unit 13 computes a sixth quality value by normalizing, by a predetermined rule, a quality value computed by the above-described technique based on a confidence factor of a detection result of a person region. Then, the quality value computation unit 13 may compute, as a quality value of a human body, a statistic (such as an average value, a maximum value, a minimum value, a medium value, a mode, and a weighted average value) of at least one of the first to fifth quality values, and the sixth quality value.

Another configuration of the image processing apparatus 10 according to the seventh example embodiment is similar to that in the first to sixth example embodiments.

The image processing apparatus 10 according to the seventh example embodiment can achieve an advantageous effect similar to that in the first to sixth example embodiments. Further, the image processing apparatus 10 according to the seventh example embodiment can provide, as a candidate for a template image to a user, a place where a person with a high confidence factor is captured. By selecting the template image from among the candidates for the template image provided in such a manner, the user can easily prepare the template image in which a detection result of a person region satisfies certain quality.

Eighth Example Embodiment

An image processing apparatus 10 according to an eighth example embodiment is different from the first to seventh example embodiments in a way of computing a quality value.

A quality value computation unit 13 computes, for each image, a partial quality value of a keypoint detected from each of a plurality of images generated by a plurality of cameras, and computes a quality value for each human body by integrating the partial quality value for each image. Then, the quality value computation unit 13 computes a partial quality value, based on a size of a human body on an image. The quality value computation unit 13 computes a partial quality value of a relatively large human body to be higher than a partial quality value of a relatively small human body. A size of a human body on an image may be indicated by a size (such as an area) of a person region indicated in the seventh example embodiment, may be indicated by a length of a predetermined bone (for example: a bone B1), may be indicated by a length between predetermined two keypoints (for example: keypoints A31 and A32), and may be indicated by another technique.

In addition, the quality value computation unit 13 may compute a quality value by combining at least one of the techniques described in the second to seventh example embodiments with the above-described technique based on a size of a human body. For example, the quality value computation unit 13 performs at least one of processing of computing a first quality value by normalizing, by a predetermined rule, a quality value computed by the technique described in the second example embodiment, processing of computing a second quality value by normalizing, by a predetermined rule, a quality value computed by the technique described in the third example embodiment, processing of computing a third quality value by normalizing, by a predetermined rule, a quality value computed by the technique described in the fourth example embodiment, processing of computing a fourth quality value by normalizing, by a predetermined rule, a quality value computed by the technique described in the fifth example embodiment, processing of computing a fifth quality value by normalizing, by a predetermined rule, a quality value computed by the technique described in the sixth example embodiment, and processing of computing a sixth quality value by normalizing, by a predetermined rule, a quality value computed by the technique described in the seventh example embodiment. Further, the quality value computation unit 13 computes a seventh quality value by normalizing, by a predetermined rule, a quality value computed by the above-described technique based on a size of a human body. Then, the quality value computation unit 13 may compute, as a quality value of a human body, a statistic (such as an average value, a maximum value, a minimum value, a medium value, a mode, and a weighted average value) of at least one of the first to sixth quality values, and the seventh quality value.

Another configuration of the image processing apparatus 10 according to the eighth example embodiment is similar to that in the first to seventh example embodiments.

The image processing apparatus 10 according to the eighth example embodiment can achieve an advantageous effect similar to that in the first to seventh example embodiments. Further, the image processing apparatus 10 according to the eighth example embodiment can provide, as a candidate for a template image to a user, a place where a human body is captured in a great size to some extent. By selecting the template image from among the candidates for the template image provided in such a manner, the user can easily prepare the template image in which a size of a human body satisfies certain quality.

Ninth Example Embodiment

An image processing apparatus 10 according to a ninth example embodiment is different from the first to eighth example embodiments in processing of selecting a place to be a candidate for a template image.

A quality value computation unit 13 determines a place where a human body with a quality value equal to or more than a threshold value and with the number of keypoints detected from each of a plurality of images generated by a plurality of cameras to be equal to or more than a lower limit value is captured. Then, an output unit 14 outputs information indicating the place where the human body with the quality value equal to or more than the threshold value and with the number of keypoints detected from each of the plurality of images generated by the plurality of cameras to be equal to or more than the lower limit value is captured, or a partial image acquired by cutting the place out of the image.

Another configuration of the image processing apparatus 10 according to the ninth example embodiment is similar to that in the first to eighth example embodiments.

The image processing apparatus 10 according to the ninth example embodiment can achieve an advantageous effect similar to that in the first to eighth example embodiments. Further, the image processing apparatus 10 according to the ninth example embodiment can provide, as a candidate for a template image to a user, a place where a human body with the above-described quality value equal to or more than a threshold value and whose keypoint equal to or more than a lower limit value is detected in each of a plurality of images generated by a plurality of cameras is captured. By selecting the template image from among the candidates for the template image provided in such a manner, the user can easily prepare the template image in which the above-described quality value is equal to or more than the threshold value and the number of the keypoints detected in each of the plurality of images satisfies certain quality.

Modification Example

In the example embodiment described above, in a case where an image is a moving image, a "place where a human body with a quality value equal to or more than a threshold value" is a partial region in each frame image being a part of a plurality of frame images constituting the moving image. Then, the output unit 14 outputs information indicating such a place, or a partial image acquired by cutting such a place out of the image. This configuration is acquired on an assumption that a plurality of human bodies may be included in one frame image.

As a modification example, in a case where an image is a moving image, a place where a human body with a quality value equal to or more than a threshold value may be a part of a plurality of frame images constituting the moving image. Then, the output unit 14 may output information indicating such a part of the plurality of frame images, or a partial image acquired by cutting a part of a frame image out of the image. Further, a frame image itself in which a human body with a quality value equal to or more than a threshold value is captured may be output as a candidate for a template image. This configuration is acquired on an assumption that only one human body with a quality value equal to or more than a threshold value may be included in one frame image.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. An image processing apparatus including:
   - a skeleton structure detection unit that performs processing of detecting a keypoint of a human body included in each of a plurality of images generated by a plurality of cameras capturing a same place:
   - a determination unit that determines a same human body included in the plurality of images generated by the plurality of cameras:
   - a quality value computation unit that computes, for each human body, a quality value of the keypoint detected from the plurality of images generated by the plurality of cameras: and
   - an output unit that outputs information indicating a place where a human body with the quality value equal to or more than a threshold value is captured, or a partial image acquired by cutting the place out of the image.
2. The image processing apparatus according to supplementary note 1, wherein
   - the quality value computation unit computes the quality value, based on a value acquired by adding a number of the keypoints detected from each of the plurality of images generated by the plurality of cameras.
3. The image processing apparatus according to supplementary note 1 or 2, wherein
   - the quality value computation unit computes the quality value, based on a number of the keypoints detected in at least one of the plurality of images generated by the plurality of cameras among the plurality of keypoints being a detection target, or a number of the keypoints not being detected in any of the plurality of images generated by the plurality of cameras among the plurality of keypoints being a detection target.
4. The image processing apparatus according to any of supplementary notes 1 to 3, wherein
   - the quality value computation unit computes, for each of the images, a partial quality value of the keypoint detected from each of the plurality of images generated by the plurality of cameras, and computes the quality value by integrating the partial quality value for each of the images.
5. The image processing apparatus according to supplementary note 4, wherein
   - the quality value computation unit computes the partial quality value, based on a confidence factor of a detection result of the keypoint.
6. The image processing apparatus according to supplementary note 4 or 5, wherein
   - the skeleton structure detection unit performs processing of detecting a person region in the image, and detecting the keypoint in the detected person region, and
   - the quality value computation unit computes the partial quality value, based on a confidence factor of a detection result of the person region.
7. The image processing apparatus according to any of supplementary notes 4 to 6, wherein
   - the quality value computation unit computes the partial quality value, based on a degree of overlapping with another human body.
8. The image processing apparatus according to supplementary note 7, wherein
   - the quality value computation unit computes the partial quality value of a human body not overlapping another human body to be higher than the partial quality value of a human body overlapping another human body.
9. The image processing apparatus according to supplementary note 8, wherein
   - the quality value computation unit computes the partial quality value of a human body located in front to be higher than the partial quality value of a human body located in rear among human bodies overlapping another human body.
10. The image processing apparatus according to any of supplementary notes 4 to 9, wherein
    - the quality value computation unit computes the partial quality value of a human body with a relatively great number of the detected keypoints to be higher than the partial quality value of a human body with a relatively small number of the detected keypoints.
11. The image processing apparatus according to any of supplementary notes 4 to 10, wherein
    - the quality value computation unit computes the partial quality value, based on a size of a human body on the image.
12. An image processing method including,
    - by one or more computers:
    - performing processing of detecting a keypoint of a human body included in each of a plurality of images generated by a plurality of cameras capturing a same place:
    - determining a same human body included in the plurality of images generated by the plurality of cameras:
    - computing, for each human body, a quality value of the keypoint detected from the plurality of images generated by the plurality of cameras: and
    - outputting information indicating a place where a human body with the quality value equal to or more than a threshold value is captured, or a partial image acquired by cutting the place out of the image.
13. A program causing a computer to function as:
    - a skeleton structure detection unit that performs processing of detecting a keypoint of a human body included in each of a plurality of images generated by a plurality of cameras capturing a same place:
    - a determination unit that determines a same human body included in the plurality of images generated by the plurality of cameras:

a quality value computation unit that computes, for each human body, a quality value of the keypoint detected from the plurality of images generated by the plurality of cameras; and an output unit that outputs information indicating a place where a human body with the quality value equal to or more than a threshold value is captured, or a partial image acquired by cutting the place out of the image.

REFERENCE SIGNS LIST

10 Image processing apparatus
11 Skeleton structure detection unit
12 Determination unit
13 Quality value computation unit
14 Output unit
1A Processor
2A Memory
3A Input/output I/F
4A Peripheral circuit
5A Bus

What is claimed is:

1. An image processing apparatus comprising:

at least one memory configured to store one or more instructions; and at least one processor configured to execute the one or more instructions to:

perform processing of detecting a keypoint of a human body included in each of a plurality of images generated by a plurality of cameras capturing a same place;

determine a same human body included in the plurality of images generated by the plurality of cameras;

compute, for each human body, a quality value of the keypoint detected from the plurality of images generated by the plurality of cameras; and output information indicating a place where a human body with the quality value equal to or more than a threshold value is captured, or a partial image acquired by cutting the place out of the image.

2. The image processing apparatus according to claim 1, wherein the at least one processor is further configured to execute the one or more instructions to compute the quality value, based on a value acquired by adding a number of the keypoints detected from each of the plurality of images generated by the plurality of cameras.

3. The image processing apparatus according to claim 1, wherein the at least one processor is further configured to execute the one or more instructions to compute the quality value, based on a number of the keypoints detected in at least one of the plurality of images generated by the plurality of cameras among the plurality of keypoints being a detection target, or a number of the keypoints not being detected in any of the plurality of images generated by the plurality of cameras among the plurality of keypoints being a detection target.

4. The image processing apparatus according to claim 1, wherein the at least one processor is further configured to execute the one or more instructions to:

compute, for each of the images, a partial quality value of the keypoint detected from each of the plurality of images generated by the plurality of cameras; and compute the quality value by integrating the partial quality value for each of the images.

5. The image processing apparatus according to claim 4, wherein the at least one processor is further configured to execute the one or more instructions to compute the partial quality value, based on a confidence factor of a detection result of the keypoint.

6. The image processing apparatus according to claim 4, wherein the at least one processor is further configured to execute the one or more instructions to:

detect a person region in the image, and detect the keypoint in the detected person region; and compute the partial quality value, based on a confidence factor of a detection result of the person region.

7. The image processing apparatus according to claim 4, wherein the at least one processor is further configured to execute the one or more instructions to compute the partial quality value, based on a degree of overlapping with another human body.

8. The image processing apparatus according to claim 7, wherein the at least one processor is further configured to execute the one or more instructions to compute the partial quality value of a human body not overlapping another human body to be higher than the partial quality value of a human body overlapping another human body.

9. The image processing apparatus according to claim 8, wherein the at least one processor is further configured to execute the one or more instructions to compute the partial quality value of a human body located in front to be higher than the partial quality value of a human body located in rear among human bodies overlapping another human body.

10. The image processing apparatus according to claim 4, wherein the at least one processor is further configured to execute the one or more instructions to compute the partial quality value of a human body with a relatively great number of the detected keypoints to be higher than the partial quality value of a human body with a relatively small number of the detected keypoints.

11. The image processing apparatus according to claim 4, wherein the at least one processor is further configured to execute the one or more instructions to compute the partial quality value, based on a size of a human body on the image.

12. An image processing method comprising, by one or more computers:

performing processing of detecting a keypoint of a human body included in each of a plurality of images generated by a plurality of cameras capturing a same place;

determining a same human body included in the plurality of images generated by the plurality of cameras;

computing, for each human body, a quality value of the keypoint detected from the plurality of images generated by the plurality of cameras; and outputting information indicating a place where a human body with the quality value equal to or more than a threshold value is captured, or a partial image acquired by cutting the place out of the image.

13. A non-transitory storage medium storing a program causing a computer to:

perform processing of detecting a keypoint of a human body included in each of a plurality of images generated by a plurality of cameras capturing a same place;

determine a same human body included in the plurality of images generated by the plurality of cameras;

compute, for each human body, a quality value of the keypoint detected from the plurality of images generated by the plurality of cameras; and output information indicating a place where a human body with the quality value equal to or more than a threshold value is captured, or a partial image acquired by cutting the place out of the image.

14. The image processing method according to claim 12, wherein the one or more computers compute the quality value, based on a value acquired by adding a number of the keypoints detected from each of the plurality of images generated by the plurality of cameras.

15. The image processing method according to claim 12, wherein the one or more computers compute the quality value, based on a number of the keypoints detected in at least one of the plurality of images generated by the plurality of cameras among the plurality of keypoints being a detection target, or a number of the keypoints not being detected in any of the plurality of images generated by the plurality of cameras among the plurality of keypoints being a detection target.

16. The image processing method according to claim 12, wherein the one or more computers compute, for each of the images, a partial quality value of the keypoint detected from each of the plurality of images generated by the plurality of cameras, and compute the quality value by integrating the partial quality value for each of the images.

17. The image processing method according to claim 16, wherein the one or more computers compute the partial quality value, based on a confidence factor of a detection result of the keypoint.

18. The non-transitory storage medium according to claim 13, wherein the program causing the computer to compute the quality value, based on a value acquired by adding a number of the keypoints detected from each of the plurality of images generated by the plurality of cameras.

19. The non-transitory storage medium according to claim 13, wherein the program causing the computer to compute the quality value, based on a number of the keypoints detected in at least one of the plurality of images generated by the plurality of cameras among the plurality of keypoints being a detection target, or a number of the keypoints not being detected in any of the plurality of images generated by the plurality of cameras among the plurality of keypoints being a detection target.

20. The non-transitory storage medium according to claim 13, wherein the program causing the computer to compute, for each of the images, a partial quality value of the keypoint detected from each of the plurality of images generated by the plurality of cameras, and compute the quality value by integrating the partial quality value for each of the images.

* * * * *